(12) United States Patent
Sylthe et al.

(10) Patent No.: US 8,108,404 B2
(45) Date of Patent: Jan. 31, 2012

(54) URL DOCUMENT VIEWING THROUGH A PLUG-IN APPLICATION FOR A MOBILE BROWSER ON A WIRELESS DEVICE

(75) Inventors: Olav A. Sylthe, Atlanta, GA (US); Dan Dumitru, Atlanta, GA (US); Eshwar Stalin, Atlanta, GA (US); Michael Hung, Willowdale (CA); Andreea Manolescu, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1516 days.

(21) Appl. No.: 11/251,551

(22) Filed: Oct. 14, 2005

(65) Prior Publication Data

US 2007/0100928 A1 May 3, 2007

(51) Int. Cl.
*G06F 17/30* (2006.01)
(52) U.S. Cl. ........................................ 707/749; 709/217
(58) Field of Classification Search .................... 707/10, 707/749; 709/200, 217; 715/501.1
See application file for complete search history.

(56) References Cited

U.S. PATENT DOCUMENTS

| 5,911,776 A * | 6/1999 | Guck ........................... 707/104.1 |
| 6,857,102 B1 * | 2/2005 | Bickmore et al. .......... 715/501.1 |
| 6,961,567 B1 * | 11/2005 | Kuhn ........................... 455/435.1 |

OTHER PUBLICATIONS

Research in Motion, "Attachment Service", XP-001167216, (2003) 11 pp.
EP Examination Report for corresponding EP Application No. 05 812 743.2-1527, Jun. 2009.

* cited by examiner

*Primary Examiner* — Shahid Alam
(74) *Attorney, Agent, or Firm* — Novak Druce + Quigg LLP

(57) ABSTRACT

A method is set forth of displaying a document identified by a URL on a mobile browser, comprising registering an attachment viewer plug-in to the mobile browser for a predetermined data stream content type, registering a mobile data service transcoder for predetermined document types, sending a request for the document of one of the predetermined document types from the mobile browser to the mobile service transcoder, retrieving and converting the document to the predetermined data stream content type, and forwarding the converted document from the mobile data service transcoder to the mobile browser for display via the attachment viewer plug-in.

9 Claims, 4 Drawing Sheets

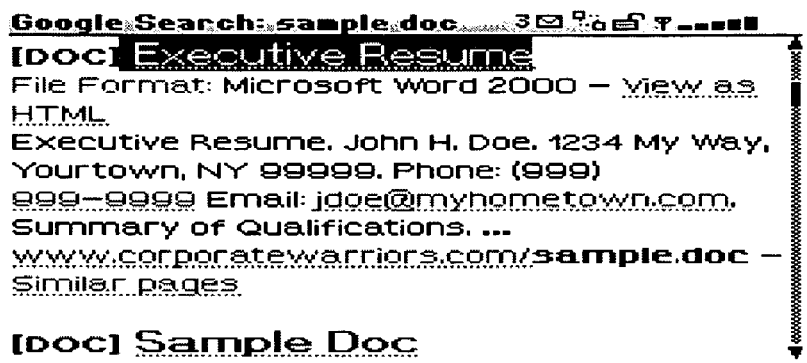
Figure 1A
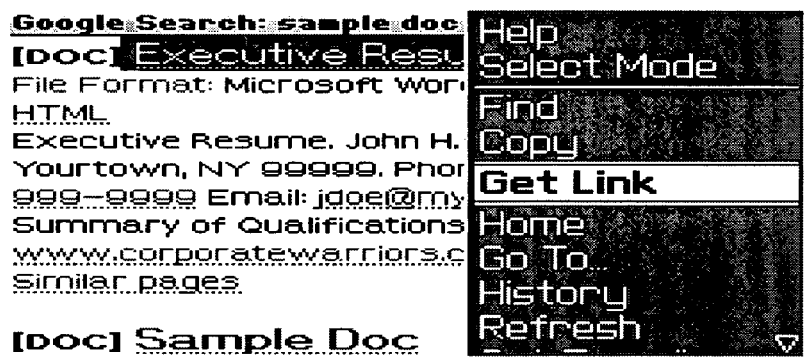
Figure 1B
Figure 2

URL DOCUMENT VIEWING THROUGH A PLUG-IN APPLICATION FOR A MOBILE BROWSER ON A WIRELESS DEVICE

BACKGROUND

1. Field

The present disclosure is directed to wireless communication devices, and more particularly to a method and apparatus for viewing documents identified by a Uniform Resource Locator (URL) from a mobile browser on a wireless communication device.

2. Description of the Related Art

Internet browser applications are well known for displaying web page content as hypertext, and for permitting user navigation between pages and downloading of documents through the use of Uniform Resource Locators (URLs). Document viewing in this manner using a desktop PC involves downloading the document and either launching the original authoring application to display the downloaded document or viewing the document through an application browser plug-in. For mobile devices, document viewing is accomplished by downloading the document onto the mobile device and launching a mobile edition of the original authoring application to display the document.

BRIEF DESCRIPTION OF THE DRAWINGS

FIGS. 1A and 1B show a mobile browser user interface with a document identified by a URL.

FIG. 2 shows the document displayed using a plug-in to the mobile browser.

DETAILED DESCRIPTION OF THE PREFERRED EMBODIMENTS

Before discussing the architectural implementation of the preferred embodiment, reference will be made to FIGS. 1 and 2, showing an exemplary mobile browser user interface for displaying a document identified by a URL in a web page.

In FIG. 1A, a URL for a document (Executive Resume) is shown within a web page (i.e. Google Search). An indication is provided (i.e. DOC) that the documented is a supported MIME (Multipurpose Internet Mail Extensions) type (i.e. MS Word®). In response to user selection of the URL, a pop-up menu appears with a "Get Link" command that, when selected, causes a browser plug-in application to display the downloaded document, as shown in FIG. 2.

Figure 3:
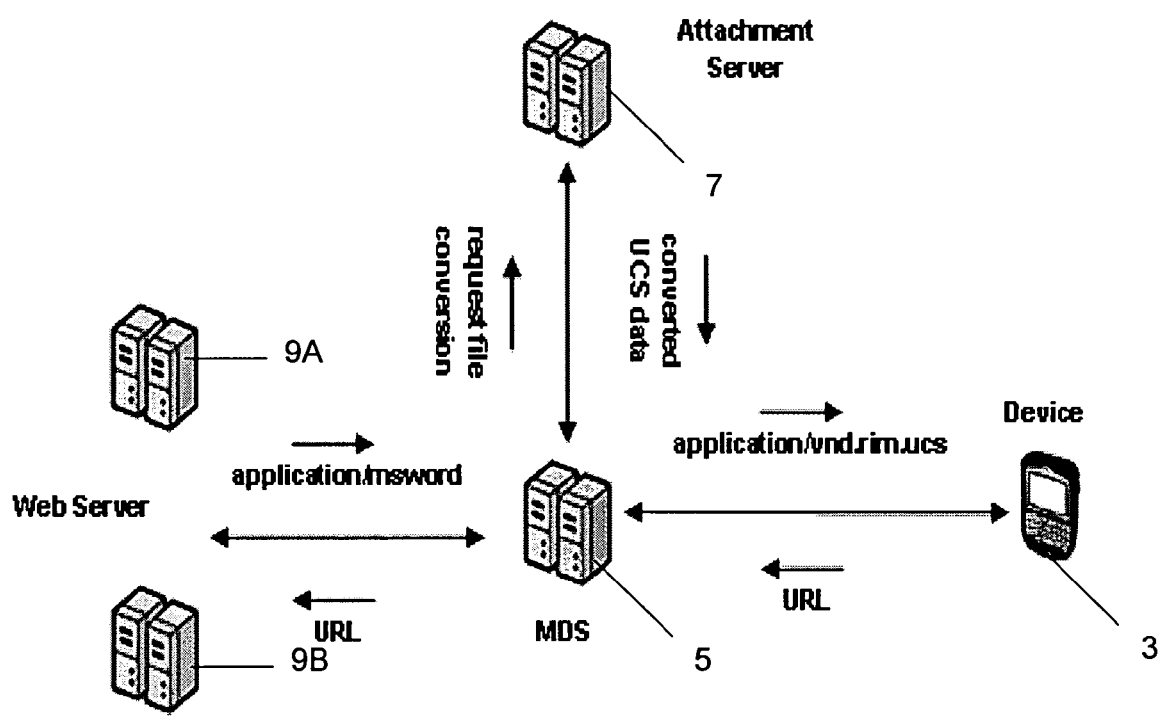
FIG. 3 is a block diagram showing plug-in data flow between the device, a Mobile Data Service (MDS), Web Server and Attachment Server, according to the preferred embodiment.

A preferred embodiment of the method and apparatus for viewing the documents displayed via the user interface of FIGS. 1 and 2, is set forth in FIG. 3. The mobile device 3 incorporates a web browser and an Attachment Viewer (referred to herein as "DocView") plug-in for the browser to permit viewing supported document MIME types when a valid URL from a web page points to a document, as discussed above in connection with FIG. 1A.

Figure 4A:
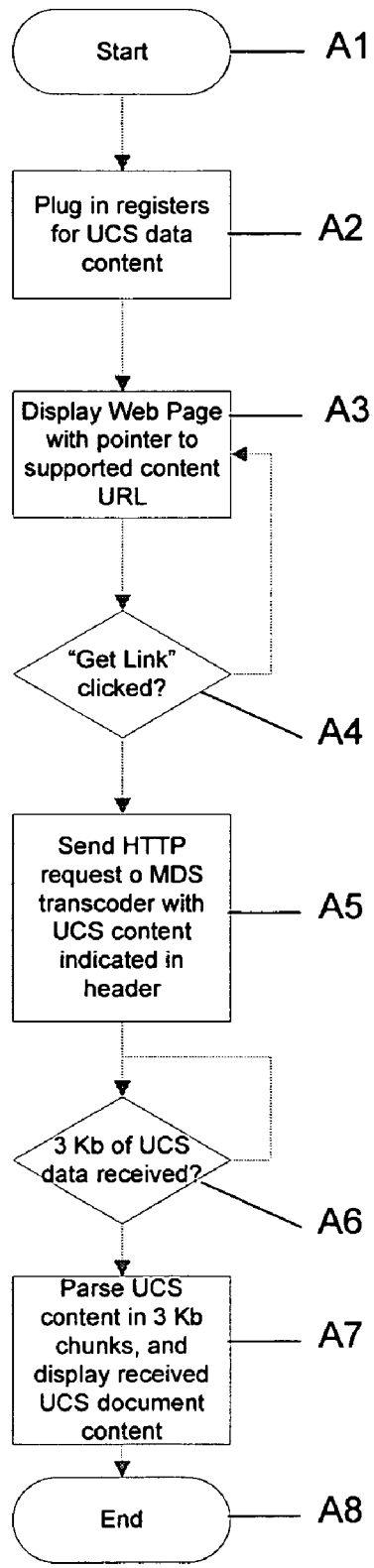
FIG. 4A shows operation of the mobile browser and plug-in, according to the preferred embodiment.

During start-up (step A1 in FIG. 4A), the Attachment Viewer browser plug-in ("DocView") registers itself (step A2) for a predetermined data stream content type, such as Universal Content Stream (UCS). According to the preferred embodiment, the browser plug-in registers an "application/vnd.company.ucs" content type with the browser, such that the browser adds "application/vnd.company.ucs" to the "Accept" header when requesting HTTP URLs.

Mobile Data Service (MDS) 5 forms a secure communication conduit between the mobile device 3 and servers, such as Web Servers 9A, 9B, etc., and Attachment Server 7. The MDS 5 functions as an HTTP and TCP/IP proxy with special features. MDS 5 incorporates a UCS transcoder that registers itself at start-up (step B1 in FIG. 4B) for all MIME content types (step B2 in FIG. 4B) supported by the Attachment Server 7 (e.g. "application/ms-word", "applications/ms-excel", etc). The Attachment Server 7 performs document conversion of attachments to a form suitable for transmission to the device 3 and display thereby. For example, if the attachment is a MS Word® document, the Attachment Server 7 performs a binary conversion of the document into UCS format, suitable for wireless delivery. The UCS format supports text, image, vector and hybrid content. Text content retains some of its original formatting, such as bold, italic and underlining, but the UCS rich text file is much smaller than the original document (e.g. 10% of the original document size).

The following content types are registered by the MDS transcoder:

| Content Type | Application |
| --- | --- |
| Application/msword | Microsoft Word |
| Application/vnd.ms-excel | Microsoft Excel |
| Application/vnd.ms-powerpoint | Microsoft PowerPoint |
| Application/pdf | Adobe PDF |
| Application/wordperfect5.1 | Corel Word Perfect 5.1 |
| Application/vnd.wordperfect | Corel Word Perfect |

When a user selects "Get Link" (FIG. 1B and step A4 in FIG. 4A) for a URL that points to a supported content type (FIG. 1A and step A3 in FIG. 4A), an HTTP request is sent (step A5 in FIG. 4A) to the MDS 5 with "application/vnd..company.ucs" added to the "Accept" header. Upon receipt of the HTTP request from the Browser (step B3 in FIG. 4B), the MDS 5 sends the HTTP request (step B4 in FIG. 4B) to the destination web server (e.g. Web Servers 9A, 9B, etc.) along with the document types that can be converted (e.g. "application/pdf") from native form to UCS data by the Attachment Server 7. The MDS 5 sends all acceptable content types to the destination server, because the UCS transcoder has registered a list of acceptable contents that can be transcoded into UCS, and the device 3 accepts UCS data.

Figure 4B:
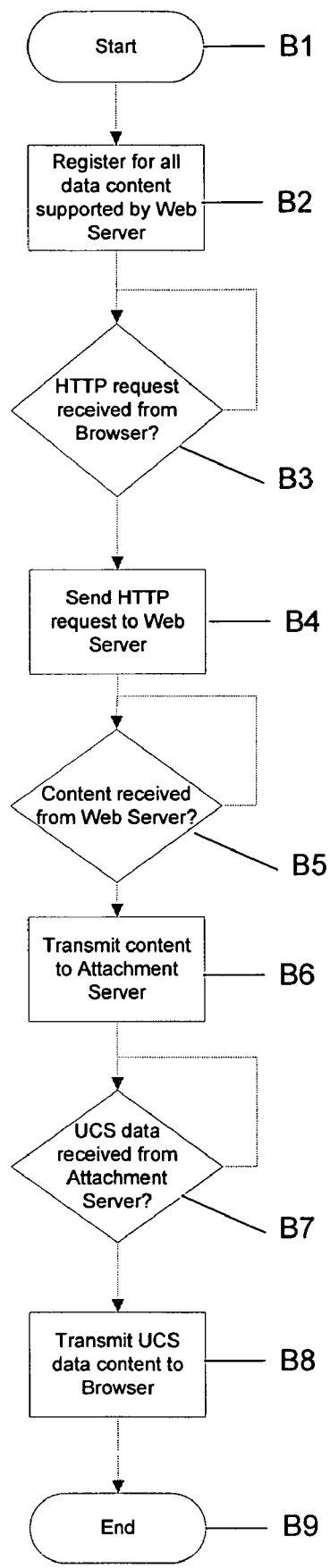
FIG. 4B shows operation of an MDS transcoder, according to the preferred embodiment.

Upon retrieving the page content from the Web Server (step B5 in FIG. 4B), MDS 5 transmits the data via the "application/vnd.company.ucs" transcoder to the Attachment Server 7 for conversion (step B6 in FIG. 4B). Upon successful binary conversion of the document to a UCS data stream, the Attachment Server 7 transmits the UCS data back to MDS 5 transcoder (step B7 in FIG. 4B), which then sends it to device browser 3 via HTTP response (step B8 in FIG. 4B), and the transcoder process ends (step B9 in FIG. 4B).

The MDS 5 pushes UCS data for the document back to the device 3 in the HTTP response (to a limit of 250 KB in the preferred embodiment, which is the default MDS setting). Upon receipt of the "application/vnd.company.ucs" content type stream (for which it registered at start up), the browser invokes the "DocView" plug-in to display the UCS data, as shown in FIG. 2. More particularly, the browser requests the DocView plug-in for a "BrowserContent" object. Once the browser receives the object it calls a finishLoading method. The Browser Plug-in invokes the Attachment Viewer passing the HTTP Input Stream as an input parameter. Then, the Attachment Viewer parses the UCS data in 3K chunks and reads more data from the HTTP Input Stream as and when required.

To avoid having the user wait until all the UCS data has been downloaded into the browser cache the plug-in invokes the browser Attachment Viewer as soon as 3 Kb of UCS data is available (step A6 in FIG. 4A) for parsing and display of the UCS content. Then, the Attachment Viewer parses and displays the UCS data in 3 Kb increments (step A7 in FIG. 4A), thereby simulating the well known attachment viewing experience when viewing an attachment via email on a mobile device, using the "More" feature. Browser process then ends (step A8 in FIG. 4A)

To preserve storage within device 3, the Attachment Viewer does not persist (i.e. save) the converted file when a conversion is requested through the plug-in. Closing the Attachment Viewer returns the user back to the previous web page from which the Get Link request was originally invoked.

As discussed above, in order to communicate with the Attachment Server 7 upon receiving requests from the browser plug-in, MDS 5 uses a dedicated transcoder that handles all request and response communication with the Attachment Server 7. Supported content types for the Attachment Server 7 are registered by the transcoder (e.g. application/pdf->application/vnd.company.ucs).

Alternatives and variations to the preferred embodiment will be understood to a person of skill in the art.

Many features and advantages are apparent from the detailed specification and, thus, it is intended by the appended claims to cover all such features and advantages. Further, since numerous modifications and changes will readily occur to those skilled in the art, it is not desired to impose any limit on the exact construction and operation illustrated and described, and accordingly all suitable modifications and equivalents may be resorted to, falling within the scope of the claims appended hereto.

What is claimed is:

1. A method of displaying a document identified by a URL on a mobile browser, comprising:
   registering an attachment viewer plug-in to said mobile browser for a predetermined data stream content type, wherein said predetermined data stream content type is Universal Content Stream (UCS);
   registering a mobile data service transcoder for predetermined document types;
   sending a request for said document of one of said predetermined document types from said mobile browser to said mobile service transcoder, wherein said mobile browser adds an indication of said UCS content type when sending said request for said document to said mobile service transcoder;
   retrieving and converting said document to said predetermined data stream content type; and
   forwarding the converted document from said mobile data service transcoder to said mobile browser for display via said attachment viewer plug-in, wherein said attachment viewer plug-in starts to display said converted document upon receiving an initial portion of said converted document.

2. The method of claim 1, wherein said initial portion is about 3 Kb.

3. The method of claim 1, wherein said predetermined document types are selected from .doc, .pdf, ppt, .xls, .pps, .wpd, and .dot.

4. Apparatus for displaying a document of a predetermined document type identified by a URL on a mobile browser, comprising:
   an attachment viewer plug-in to said mobile browser for displaying attachments conforming to a predetermined data stream content type, wherein said predetermined data stream content type is Universal Content Stream (UCS); and
   a mobile data service transcoder for receiving a request for said document from said mobile browser, said request containing an indication of said UCS content type, and initiating retrieval and conversion of said document from said predetermined document type to said predetermined data stream content type, and transmitting said converted document to said mobile browser for display via said attachment viewer plug-in, wherein said attachment viewer plug-in starts to display said converted document upon receiving an initial portion of said converted document.

5. The apparatus of claim 4, wherein said initial portion is about 3 Kb.

6. The apparatus of claim 4, wherein said predetermined document types are selected from .doc, .pdf, ppt, .xls, .pps, .wpd, and .dot.

7. A method of displaying a document of a predetermined document type identified by a URL on a mobile browser, comprising:
   registering an attachment viewer plug-in to said mobile browser for a predetermined data stream content type, wherein said predetermined data stream content type is Universal Content Stream (UCS);
   sending a request for said document from said mobile browser for remote retrieval and conversion of said document to said predetermined data stream content type, wherein said request includes an indication of said UCS content type; and
   displaying the converted document via said attachment viewer plug-in upon receiving an initial portion of said converted document.

8. The method of claim 7, wherein said initial portion is about 3 Kb.

9. The method of claim 7, wherein said predetermined document type is selected from .doc, .pdf, ppt, .xls, .pps, .wpd, and .dot.

* * * * *